May 26, 1953

A. MORDE 2,639,702

PRIMING DEVICE

Filed April 6, 1951

INVENTOR.
ALBERT MORDE
BY
*James J. Kennedy*
ATTORNEY.

Patented May 26, 1953

2,639,702

UNITED STATES PATENT OFFICE 2,639,702

PRIMING DEVICE

Albert Morde, New Bedford, Mass.

Application April 6, 1951, Serial No. 219,605

3 Claims. (Cl. 123—180)

This invention relates to devices for priming internal combustion engines.

The general object of the invention is to provide a device for introducing a starting fuel into an engine intake for starting the engine.

Another object of the invention is to provide a device of the character indicated which will not interfere with the normal functioning of the engine.

With the foregoing object, as well as others, which will appear, in mind the invention consists in the combinations and arrangements of parts, and details of construction, which will now first be fully described with reference to the accompanying drawing and then be more particularly pointed out in the appended claims.

Figure 1:
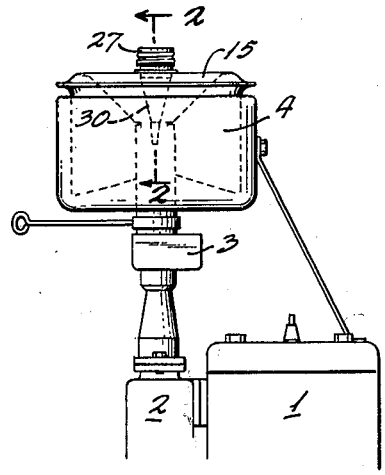
Fig. 1 is a schematic elevation view of a device embodying the invention in a preferred form, showing also the mounting thereof on an engine.
Figure 3:
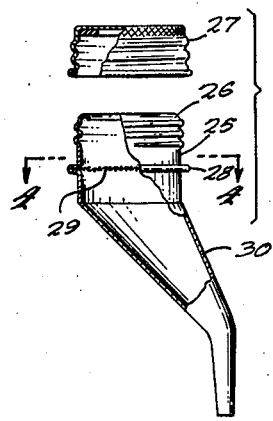
Fig. 3 is an exploded view, partly in section of a filler funnel and cap incorporated in the device of Fig. 2.
Figure 4:
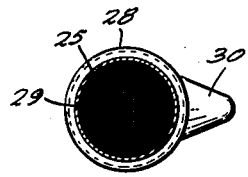
Fig. 4 is a plan view of the filler funnel of Fig. 3.
Figure 2:
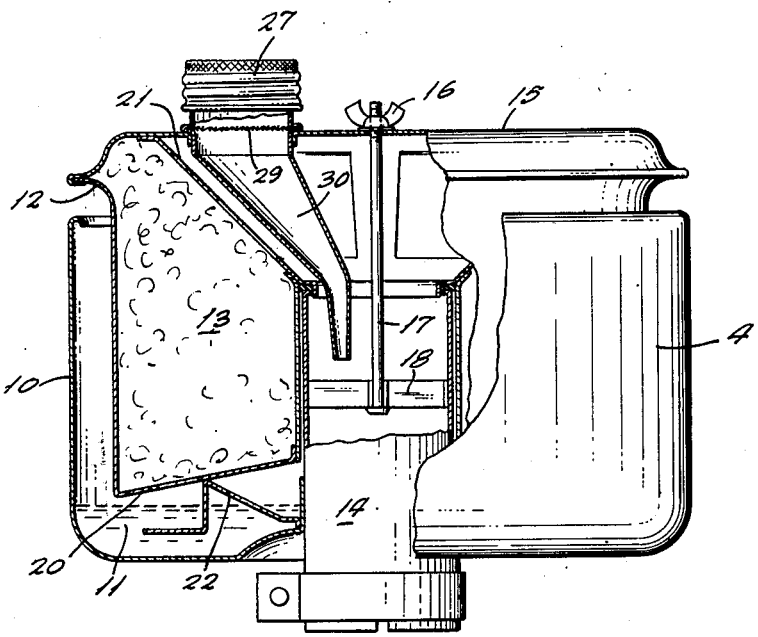
Fig. 2 is an enlarged view of a part of Fig. 1, and is partly in central vertical section.

In Fig. 1, the numeral 1 indicates an engine block to which is attached an intake manifold 2, supplied with fuel air mixture by carburetor 3. Air filter 4 serves to remove dust from the air intake to the carburetor. This filter is generally of known type, comprising an annular outer shell 10, the lower part of which may contain a body of oil 11, and an annular inner container 12 filled with suitable filter material 13. The shell 10 and container 12 surround and are supported by a pipe 14 which connects to the carburetor intake. Cover 15 of the container 12 is fastened down by a wing nut 16 on a central rod 17 supported by a cross bar 18 in the pipe 14. Openings 20 and 21 provide for flow into and out of the filter space within container 12, and a baffle 22 prevents direct flow from the space between shell 10 and container 12 into the pipe 14. The course of flow of the air is downwardly in the shell 10, up through openings 20, through the filter material 13, through openings 21 and thence down the pipe 14.

The priming device comprises a cup 25, threaded at 26 to take screw cap 27 and crimped to form a flange 28 which holds a wire gauze or similar strainer 29 in position. Below the strainer the cup is provided with a tapering spout 30 for directing starting fluid into the pipe 14, thus furnishing the fluid direct to the carburetor and intake manifold, without passing through the filter material 13. The cup 25 fits snugly within an opening in the cover 15, resting on flange 28, and the joint may be sealed in any desired way, as by soldering, to prevent air leakage. For easy starting in cold weather, extremely volatile fluid may be desirable. The fluid, when poured in the cup 25, quickly passes through the screen or filter 29 and spout 30 and drops into pipe 14, which is directly above the carburetor intake.

What is claimed is:

1. A priming device for engines having an air filter, comprising a cup and a duct leading therefrom to the engine intake at a point beyond the air filter material, and a cover for the said cup, whereby starting fuel may be supplied to the engine without passing through the filter material and the normal operation of the engine is not interfered with when said cup is closed by said cover.

2. A priming device for engines having an air filter with cover, comprising a cup mounted on the air filter cover, and a duct leading therefrom to the engine intake at a point beyond the air filter material, and a cover for the said cup, whereby starting fuel may be supplied to the engine without passing through the filter material and the normal operation of the engine is not interfered with when said cup is closed by said cover.

3. A priming device for engines having an air filter with cover, comprising a cup mounted on the air filter cover and spaced from the center thereof, and a duct leading therefrom downwardly and to the center of the air filter at a point beyond the air filter material, and a cover for the said cup, whereby starting fuel may be supplied to the engine without passing through the filter material and the normal operation is not interfered with when said cup is closed by said cover.

ALBERT MORDE.

References Cited in the file of this patent

UNITED STATES PATENTS

| Number | Name | Date |
|---|---|---|
| 1,208,087 | Browne | Dec. 12, 1916 |
| 1,251,342 | Craven | Dec. 25, 1917 |
| 2,314,140 | Graziano | Mar. 16, 1943 |

FOREIGN PATENTS

| Number | Country | Date |
|---|---|---|
| 279,256 | Great Britain | Oct. 27, 1927 |